(12) United States Patent
Rosman et al.

(10) Patent No.: US 6,260,054 B1
(45) Date of Patent: Jul. 10, 2001

(54) RECIPROCAL GENERATOR USING PIECE-WISE-LINEAR SEGMENTS OF VARYING WIDTH WITH FLOATING-POINT FORMAT

(75) Inventors: Andrew Rosman, Palo Alto; Tao Lin, Fremont, both of CA (US)

(73) Assignee: NeoMagic Corp., Santa Clara, CA (US)

( * ) Notice: Subject to any disclaimer, the term of this patent is extended or adjusted under 35 U.S.C. 154(b) by 0 days.

(21) Appl. No.: 09/182,349

(22) Filed: Oct. 29, 1998

(51) Int. Cl.[7] ................................. G06F 7/52; G06F 7/38
(52) U.S. Cl. ............................................. 708/502; 706/654
(58) Field of Search ........................................ 708/270, 272, 708/274, 510, 504, 502, 606, 653, 654

(56) References Cited

U.S. PATENT DOCUMENTS

| | | |
|---|---|---|
| 3,917,935 | 11/1975 | Lazecki . |
| 4,688,186 | 8/1987 | Ferrell et al. . |
| 4,707,798 | 11/1987 | Nakano . |
| 4,718,032 | 1/1988 | Irukulla et al. . |
| 4,823,301 | 4/1989 | Knierim . |
| 5,012,438 | 4/1991 | Yamaguchi . |
| 5,060,182 | 10/1991 | Briggs et al. . |
| 5,249,149 | 9/1993 | Cocanougher et al. . |
| 5,377,134 | 12/1994 | Faget . |
| 5,563,818 | 10/1996 | Agarwal et al. . |
| 5,818,744 | * 10/1998 | Miller et al. ........................ 708/654 |
| 5,928,318 | * 7/1999 | Araki .................................. 708/650 |
| 6,163,791 | * 12/2000 | Schmookler et al. ............ 708/502 |

* cited by examiner

Primary Examiner—Chuong Dinh Ngo
(74) Attorney, Agent, or Firm—Stuart T. Auvinen

(57) ABSTRACT

A reciprocal generator is useful for perspective correction for 3D graphics. The input range is divided into many sections. A lookup table contains reciprocal outputs for only two of the sections, the smallest-inputs section and the largest-inputs section. Entries in the table for the smallest section contain a base and a scale factor to indicate the reciprocal value. One entry is provided for each possible input value in the smallest section. This provides high precision where the outputs have the largest values, reducing visible distortions caused by relatively small changes in the large output values. Each section is divided into intervals, with one table entry for each interval. For the largest section, each table entry has an initial reciprocal and a slope of a line approximating the reciprocal curve in that interval. Reciprocals for inputs within the interval are calculated by multiplying an offset into the interval by the slope, and then adding to the initial reciprocal for that interval. Each section is twice as wide as the previous section, but has the same number of intervals. A scale factor is generated by counting a number of leading zeros in the input. Then the input is shifted by the number of leading zeros and input of the table. Thus the inputs are scaled to points within the largest section, so intermediate sections do not have to be stored in the table.

17 Claims, 7 Drawing Sheets

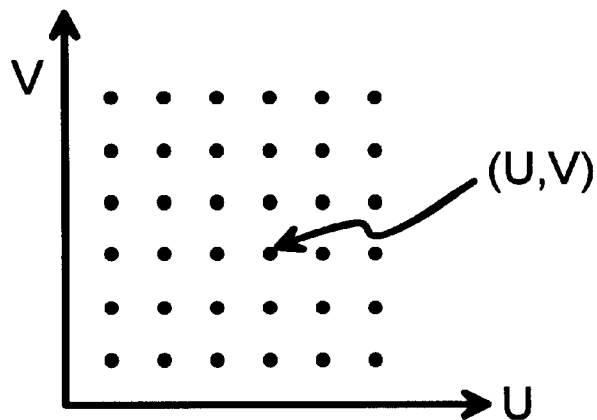
FIG. 1
$$U/W * 1/RW = U$$
$$V/W * 1/RW = V$$
FIG. 2
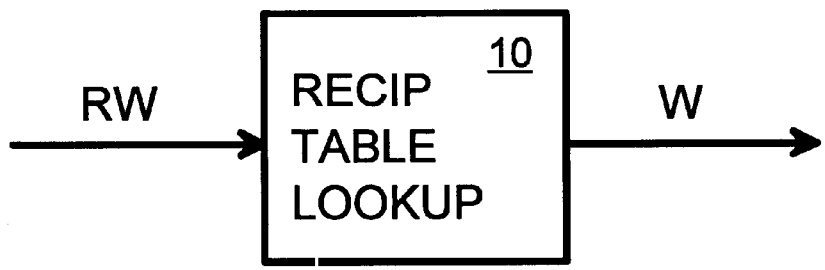
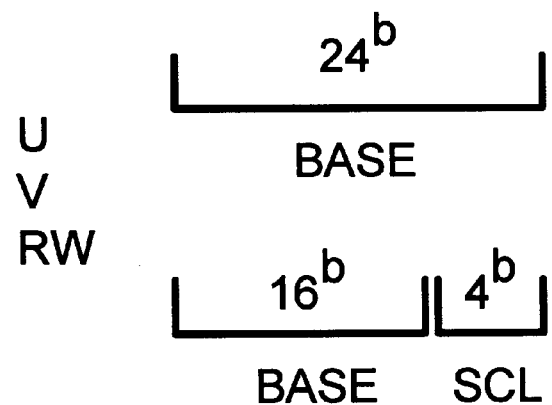
FIG. 3

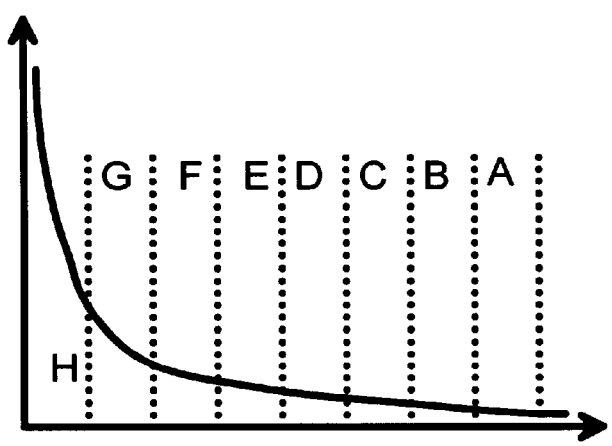
FIG. 4
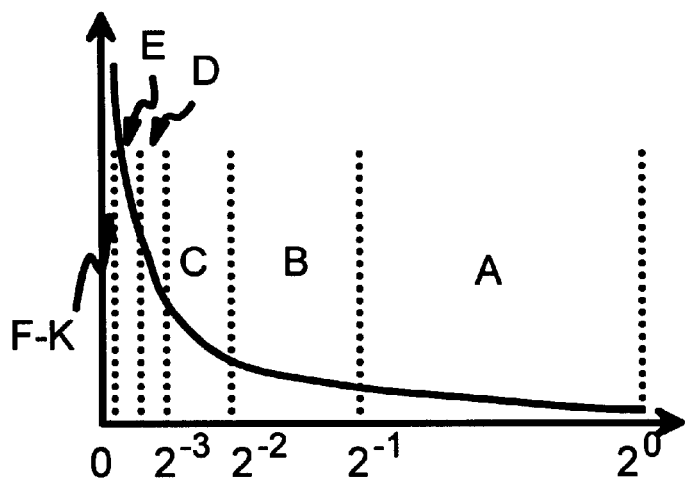
FIG. 5
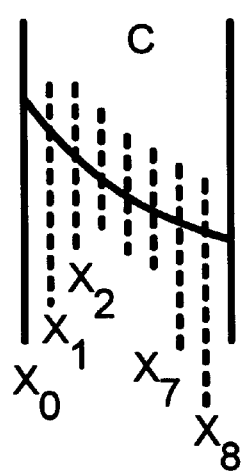
FIG. 6
| $X_0$ | $Y_0$ | $SLOPE_0$ |
| $X_1$ | $Y_1$ | $SLOPE_1$ |
| $X_2$ | $Y_2$ | $SLOPE_2$ |
| ⋮ | ⋮ | ⋮ |
| $X_8$ | $Y_8$ | $SLOPE_8$ |
FIG. 7

| SECTION | PRIORITY ENCODER | # OF INTERVALS | BITS THAT ID THE INTERVAL | BITS THAT ID INTERPOLANT | OUT SCALE FACTOR |
|---|---|---|---|---|---|
| A | 0 | 64 | 15:9 | 8:0 | 0 |
| B | 1 | 64 | 14:8 | 7:0 | 1 |
| C | 2 | 64 | 13:7 | 6:0 | 2 |
| D | 3 | 64 | 12:6 | 5:0 | 3 |
| E | 4 | 64 | 11:5 | 4:0 | 4 |
| F | 5 | 64 | 10:4 | 3:0 | 5 |
| G | 6 | 64 | 9:3 | 2:0 | 6 |
| H | 7 | 64 | 8:2 | 1:0 | 7 |
| I | 8 | 64 | 7:1 | 0:0 | 8 |
| J | 9 | 64 | 6:0 | None | 9 |
| K | 9 | 64 | 6:0 | None | 10-15 |

FIG. 10

| SECTION | PRIORITY ENCODER | # OF INTERVALS | BITS THAT ID THE INTERVAL | BITS THAT ID INTERPOLANT | OUT SCALE | OUT SCALE FACTOR |
|---|---|---|---|---|---|---|
| A | 7 | 32 | 14:10 | 9:0 | -16:-35 | E |
| B | 6 | 32 | 13:9 | 8:0 | -15:-34 | D |
| C | 5 | 32 | 12:8 | 7:0 | -14:-33 | C |
| D | 4 | 32 | 11:7 | 6:0 | -13:-32 | B |
| E | 3 | 64 | 10:5 | 4:0 | -12:-31 | A |
| F | 2 | 64 | 9:4 | 3:0 | -11:-30 | 9 |
| G | 1 | 128 | 8:2 | 1:0 | -10:-29 | 8 |
| H | 0 | 128 | 7:1 | 0 | -1:-20 | 0 |

FIG. 12

RECIPROCAL GENERATOR USING PIECE-WISE-LINEAR SEGMENTS OF VARYING WIDTH WITH FLOATING-POINT FORMAT

FIELD OF THE INVENTION

This invention relates to computer-graphics systems, and more particularly to reciprocal generators for texture-map perspective correction.

BACKGROUND OF THE INVENTION

Higher-integration IC's (integrated circuits) and lower costs have allowed for increasingly complex graphics systems in personal computers (PCs). The two-dimensional dimensional 'blackboard' of yesterday's PC's monitor is coming to life as three-dimensional objects are rendered in real-time using 3D graphics engines. Realistic-looking objects are rendered by extending the basic pixel (picture element) to include texture attributes comprised of texels (texture elements).

Complex calculations are required to transform and render 3D objects on the PC's two-dimensional screen. These objects are often rendered with surface textures. These textures are defined by texture maps. Texture maps are 2 dimensional arrays of pixels, or texels, that are transformed onto the surface in order to render finer detail.

The texture map describes the texture pattern of the surface as it appears to a viewer directly over the surface at a 90-degree normal to the surface. However, when a surface is viewed at an oblique angle, the surface texture is compressed. If viewed through a parallel projection, meaning the eye is at infinity, the compression is linear across the screen. However, if viewed through a perspective projection, meaning the eye is at a finite distance from the screen, the compression is non-linear. Thus some perspective correction is needed. This correction is accomplished by altering the address of the texel selected from the texture map.

FIG. 1 shows a texture map. The pixels in the texture map that form the surface pattern are arranged in a 2-dimensional coordinate space (u,v). One of the pixels in the texture map is selected by calculating the (u,v) coordinate of the texture map from the non-perspective-corrected pixel coordinates.

The 3D graphics engine generates a non-corrected coordinate that corresponds to (u/w, v/w). The (u,v) coordinate is obtained by multiplying u/w and v/w by w. However, w is not directly known. Instead, the reciprocal of w, called rw, is generated by the 3D engine or the applications-programming interface (API) along with (u/w, v/w). From rw, (u,v) is calculated as u=(u/w)*(1/rw) and v=(v/w)*(1/rw). The reciprocal of rw, 1/rw, must be calculated. The perspective for each pixel is corrected by the rw value.

Perspective correction thus requires the generation of the reciprocal of the rw value. FIG. 2 highlights that w is obtained by performing a reciprocal function on the rw input. Then the reciprocal (w) is multiplied by the coordinates u/w and v/w to obtain the (u,v) coordinate for the texture map. Often a large table in memory such as table lookup 10 is used to perform directly the reciprocal function. Table lookups are desirable since the complex calculations can be performed ahead of time and stored in the table for all possible input values. Thus arithmetic logic circuits are not needed for the reciprocal function.

Unfortunately, reciprocal functions produce a large range of outputs. The rw value can itself be any number from near zero to $2^{16}$ for a 16-bit rw. Values of rw that are near zero produce very large reciprocals. For example, the reciprocal of 0.001 is 1000, while the reciprocal of 0.000001 is 1,000,000. On the other hand, the reciprocal of $2^{15}$ is $2^{-15}$, a very small number. The wide dynamic range of the reciprocal function presents a challenge when using lookup tables, since the tables can require many entries, requiring a large and expensive memory.

Although the rw, u/w, and v/w values are provided as 32-bit fixed-point variables, these could be converted to a floating-point format to more efficiently perform the reciprocal function. However, standard floating point formats may require very expensive mechanization.

What is desired is a reciprocal generator for perspective correction of texture maps in a 3D graphics system. It is desired to minimize the transistor count associated with the implementation while maintaining sufficient fidelity in the output in order to avoid aliasing effects. It is desired to maintain a high pipeline throughput rate for each pixel while minimizing the transistor count. It is desired to minimize the size of a lookup table for a reciprocal function. It is desired to efficiently organize entries in the lookup table to provide sufficient precision over a large dynamic range of inputs and outputs. A better approximation of a reciprocal function is desired when using a limited-size lookup table and attend antiogic circuits. A high-speed reciprocal generator that uses a lookup table and a minimal set of logic circuits and operates over a wide dynamic range is desired.

SUMMARY OF THE INVENTION

A reciprocal generator has an input bus. A leading-zero detector is coupled to the input bus. It generates a scale factor indicating a number of leading zeros of an input value on the input bus. A shifter is responsive to the leading-zero detector. It shifts the input bus by a number of bit-positions indicated by the leading-zero detector to produce a shifted input.

A lookup table is coupled to the shifter. It has entries, with each entry having an initial reciprocal field and a slope field. The lookup table outputs an initial reciprocal and a slope for an entry selected by a portion of the shifted input. An interpolator is coupled to the lookup table. It generates a reciprocal base from the initial reciprocal and the slope output by the lookup table. The reciprocal of the input bus is the reciprocal base from the interpolator scaled by the scale factor from the leading-zero detector. Thus the reciprocal is generated from the lookup table and the scale factor from the leading-zero detector.

In further aspects the input bus has an input range. The input range is divided into a plurality of sections. The lookup table does not have separate entries for each of the plurality of sections. Instead, the lookup table has entries for a last section, the last section having largest input values. Thus entries for the last section but not all sections are stored in the lookup table. Each successive section has twice an input range of a previous section. Thus successive sections are doubled in input-width.

In further aspects the interpolator further has a multiplier coupled to the lookup table and coupled to the shifter. It forms a product of lower bits of the shifted input and the slope from the lookup table. An adder is coupled to the multiplier and to the lookup table. It forms a sum of the product from the multiplier and the initial reciprocal from the lookup table. The sum from the adder is output as the reciprocal base.

In still further aspects the leading-zero detector is coupled to only upper bits of the input bus and not connected to lower bits of the input bus. Thus the leading-zero detector detects a limited number of leading zeros.

In other aspects the lookup table further stores entries for a first section. The first section has smallest input values. The smallest input values are less than input values from all other sections in the plurality of sections. Thus the lookup table contains entries for only the first section and the last section, but not for intermediate sections. The lookup table has a reduced number of entries than a table having separate entries for all sections.

In other aspects a scale mux is coupled to the leading-zero detector. It outputs the scale factor from the leading-zero detector for all sections except the first section, but it outputs a scale factor from the lookup table when the input value on the input bus is in the first section. The lookup table stores entries for the first section and the last section. The entries for the first section contain the initial reciprocal and a stored scale factor. The stored scale factor is output by the scale mux as the scale factor for the initial reciprocal. Thus scale factors for the first section are stored in the lookup table, but scale factors for other sections are generated by the leading-zero detector.

BRIEF DESCRIPTION OF THE DRAWINGS

FIG. 1 shows a texture map.

FIG. 2 highlights that w is obtained by performing a reciprocal function on the rw input.

FIG. 3 highlights that a 24-bit fixed input is converted to a scaled input for application to the reciprocal lookup table.

FIG. 4 shows a reciprocal function divided into equal-width sections.

FIG. 5 shows a reciprocal function divided into exponentially-increasing sections.

FIG. 6 highlights a single section that is divided into intervals.

FIG. 7 shows a portion of a lookup table for the simplified section C of FIG. 6.

FIG. 10 is a table showing the input bits used for accessing the lookup table and the scaling factors generated for each of the 11 sections.

FIG. 12 is a table for the alternate embodiment with variable numbers of intervals.

DETAILED DESCRIPTION

Figure 8:
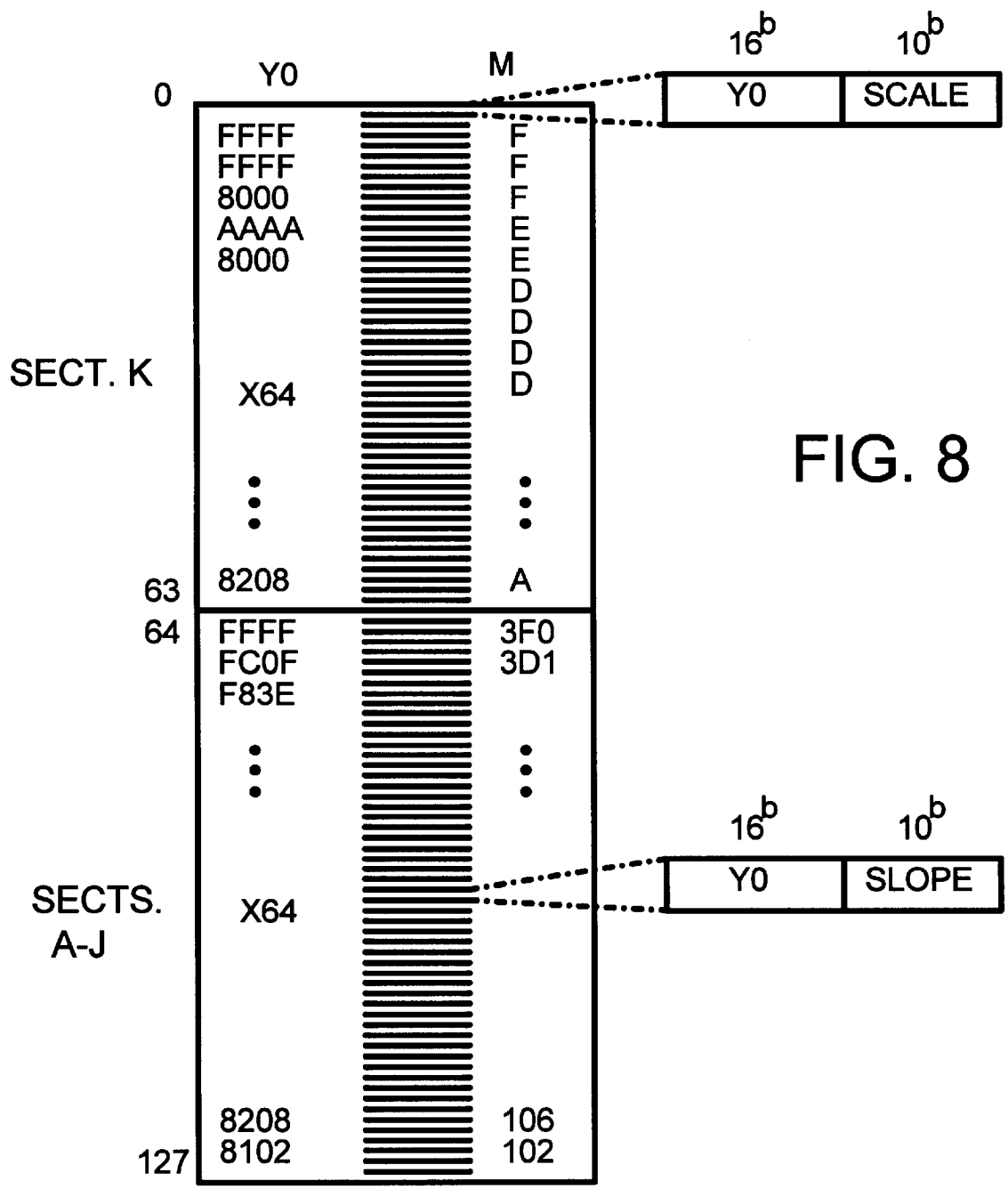
FIG. 8 shows that the lookup table stores the smallest section and a template section.

The present invention relates to an improvement in graphics systems. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

The inventors have realized that a full floating point format is not required for efficient and accurate reciprocal generation. Instead, a simple scaled format is used. The lookup table itself can also be scaled so that more entries are available for the lowest input values, which are more sensitive to error than larger input values. Thus the accuracy of the reciprocal generator is improved. The inventor has further realized that the range of inputs can be divided into sections that vary in width, and the sections themselves can be further divided into equal-width intervals. Errors are then limited to an error within the interval. Thus higher precision is provided for some sections than for others.

The inventors have also realized that when the reciprocal function is divided such that each successive section has twice the input range as the preceding section, the shape of the reciprocal function in all sections is similar. A single section can be stored in the lookup table. The table output is then scaled to the proper value for the particular section. Storage requirements for the lookup table are significantly reduced when only one of the sections is stored in the table.

The inventors have further refined their invention to store two sections in the lookup table. The section for the smallest input values (and largest output values) is stored in the table. Storing the smallest section provides increased accuracy for output values that are most sensitive to input values. In addition to storing the smallest section, a scaled section is stored in the table. This scaled section is a template for all other sections. The output of the scaled section is then scaled to the proper values for the corresponding input section.

FIG. 3 highlights that a 24-bit fixed input is converted to a scaled input for application to the reciprocal lookup table. The pixel values u, v, and rw are generated by the API as 24-bit fixed integers, with the decimal point before the first digit. These are converted to a scaled format that has 16 base bits and a 4-bit scaling factor. The 16 base bits are multiplied by 2 raised to the scale factor to obtain a approximation of the 24-bit fixed input. Although some precision is lost, reciprocal generation using the scaled input is simplified, allowing for greater precision for a fixed-length lookup table.

FIG. 4 shows a reciprocal function divided into equal-width sections. The input values on the x axis are divided into 8 equal-width sections, labeled A to H. For a 16-bit positive-number input, with the decimal point before the first digit, the largest input is $2^{16}-1$, representing the value $1-2^{-16}$, while the smallest input is 1, representing the value $2^{-31\ 16}$. Section A has input values from 0.875 to $1-2^{-16}$, while section H has the smallest inputs, from $2^{-16}$ to 0.125. Each section has input values over a range of 0.125. However, the output values vary significantly from section to section. For example, the outputs for section A range are in the range of 8/7 to almost 1, while the outputs for section H are 8 to $2^{16}$, a huge range of almost $2^{16}$. Significant error in the output occur in section H, the smallest-input section, since the reciprocal output increases so rapidly as input values near zero.

FIG. 5 shows a reciprocal function divided into exponentially-increasing sections. Each section is double the width (input range) of the preceding section. For example, section C ranges from $2^{13}$ to $2^{14}-1$, or 8K, while next section B ranges from $2^{14}$ to $2^{15}-1$, or 16K. The largest section, A, ranges from $2^{15}$ to $2^{16}-1$, or 32K. Thus the input ranges double with each successive section. Smaller-input sections D to K are each successively smaller than section C, with section D being 4K wide, E being 2K, F is 1K, G is 512 wide, H is 256, I is 128, J is 64, and the smallest section K is also 64 wide.

Since each section is double the input-width of the preceding section, the first reciprocal output of each section is half the value of the first reciprocal in the preceding section. Likewise, the last reciprocal output in a section is also half the value of the last reciprocal in the preceding section. Intermediate points within a section likewise have reciprocals that are half of the reciprocal for a corresponding point in the preceding section.

Since reciprocal values in one section are thus related to values in other sections, a single section or reciprocals may be stored in the lookup table, and the outputs then scaled to the proper value. For example, if reciprocal outputs for section A are stored, outputs for section B are doubled, outputs for section C are multiplied by four, outputs for section D are multiplied or scaled by eight, and so on.

FIG. 6 highlights a single section that is divided into intervals. In the simplified example, section C is divided into 8 intervals. The initial input value for each interval is labeled $X_0, X_1, \ldots X_7$. The reciprocal outputs for each of these initial interval inputs are $Y_0, Y_1, \ldots Y_7$.

Many input and output values can fall within any interval. The reciprocal for any point within each interval can be approximated as a straight line between the interval endpoints. This is a piece-wise-linear approximation, and errors are small when the intervals are small.

FIG. 7 shows a portion of a lookup table for the simplified section C of FIG. 6. The lookup table contains one entry for each interval in the section. Each entry contains the reciprocal value at the start of the interval, $Y_0, Y_1, \ldots Y_7$ and the slope of the approximating line for the reciprocal function in the interval, $SLOPE_1, SLOPE_2, \ldots SLOPE_7$. The lookup table is indexed by the interval in which the desired input lies.

The reciprocal outputs for input values within an interval, such as interval 3, can be calculated from the initial reciprocal output $X_3$ and the slope of the reciprocal within that interval, $SLOPE_3$. For the linear approximation of interval 3, $Y_1=Y_3+i*SLOPE_3$, where i is the distance from the initial input value in the interval to the desired input point.

While this simplified example has shown 8 intervals in a section, the preferred embodiment has 64 intervals for each of the sections. The lookup table has 64 entries for a section.

Lookup Table Stores Only 2 Sections—FIG. 8

FIG. 8 shows that the lookup table stores the smallest section and a template section. The smallest section K is stored in the first 64 entries of the lookup table. Since the smallest section K has only 64 input values (0000000 to 0111111 or 63), only 64 entries are needed for section K. The address of each entry corresponds to the input value.

Since the number of possible input values (64) equals the number of entries or intervals, each interval is exactly one input wide. No interpolation is needed. Thus the slopes do not have to be stored for section K. Only the reciprocal values for each input are stored. These reciprocal values are stored as the initial interval values Y0 in a 16-bit field. The 10-bit field that is normally used for the slope is instead used for a stored scaling factor. Only four of the ten bits are used for the stored scaling factor. This stored scaling factor allows the reciprocal values to be scaled, giving the smallest section K a wider output range than otherwise possible. Thus output range for the smallest section is increased by using the slope fields to store a scaling factor.

The stored scaling factors vary from 10 to 15 decimal, or A to F hex. They represent the power of two that the reciprocal output Y0 is scaled to. The Y0 value is in hexadecimal and is assumed to have a decimal after the first digit. For example, the input values of 000000 and 000001 have Y0 of FFFF and scale M of 15. The reciprocal is thus $0.FFFF \times 2^1 \times 2^{15}$, or $2^{16}-1$, the maximum output value for 16 bits.

When the input value is zero, the reciprocal is undefined, and may be set to FFFF (hex), the maximum output value for 3D graphics rendering.

The input value 000010 which represents $2^{-15}$ selects the third entry in the table, $0.8000 \text{ Hex} \times 2 \times 2^{15}$, or $2^{15}$, while the input value 000011 selects the fourth entry in the table, $0.AAAA \text{ Hex} \times 2^{14+1}$. The fifth entry produces a reciprocal of $0.8000 \text{ Hex} \times 2^{14+1}$. The reciprocal continues to decrease as the scale factor decreases from 15 to 14, 13, and down to 10.

More entries are used for lower scale factors. Two entries are used for a scale of 14, four for scale 13, 8 for scale 12, 16 for scale 11, and 31 entries for scale 10. The shape of the reciprocal function dictates this. The largest input value in section K, $2^6-1$ or 63 (111111), which represents the number $63 \times 2^{-6}$, has a Y0 of 8208 and a scale of 10, which produces a reciprocal output of $0.8208 \text{ Hex} \times 2^{10+1}$, or about $1.015869 \times 2^{10}$.

The initial reciprocal value Y0 stored for any entry q>2 in section K is calculated as $2^{16+15-M}/q$. M is the scale factor, which starts at 15 and drops to 10 for the last entry (q=63). This makes $2^{16+15-M}/q$ a 16-bit integer with a MSB of 1. Section K has 64 ($2^6$) entries from entry 0 to entry 63. The Y0 value is stored as a 16-bit number with the decimal point assumed to be to the right of the leading bit. Y0 has the format 1.15, with one integer bit and 15 fractional bits.

While the first (upper) half of the lookup table stores entries for the smallest section K, the second (lower) half of the lookup table stores a section template. The section template contains the reciprocal values for the section with the largest inputs, section A. The shape of the reciprocal function in section A has the same shape as the reciprocal in other sections because each section is doubled in width. Thus a single section template is used for all sections A–J. Only the section with the smallest inputs (and largest outputs), section K, has separate entries in the lookup table.

Logic external to the lookup table scales up the inputs from other sections to section A inputs, and then scales up the template-section (A) output with a scaling factor to generate the proper reciprocal value for sections B–J. Thus section A's reciprocals are used to generate reciprocals for all other sections except the smallest section (K).

Entries 64 to 127 are used to store the reciprocals for section A, which are used for all sections A–J. Each section is divided into 64 intervals. Within a section all intervals are equal in width, but intervals are proportional to the width of the section, so that intervals in section C are one quarter the width of intervals in section A, while intervals in section B are one-half the width of intervals in section A. A total of 64 entries are used for the 64 intervals in a section.

Each of the 64 entries has a 16-bit Y0 field, which is the reciprocal value for the start of the interval. Each entry also contains a 10-bit slope field (M), which contains the slope of a line that approximates the reciprocal within the interval. The reciprocal for any point within the interval is calculated using a linear equation for the approximating line. Thus the reciprocal of a point within the interval is calculated as the initial reciprocal Y0 for the interval, plus the interval's slope multiplied by the difference between the point's x (input) value and the x (input) value of the initial interval (Y0).

The first entry has an initial reciprocal Y0 of FFFF Hex, and a slope of 3F0 Hex, both hexadecimal numbers. The initial reciprocals are understood to have the decimal after the first hexadecimal digit, so the actual reciprocal is $0.FFFF \text{ Hex} \times 2$ for the first entry. The slope is assumed to be negative, since smaller reciprocal values occur at larger input values. The slope drops to 3D1 Hex for the second interval, and continues decreasing until the slope reaches 106 Hex for the penultimate interval, and 102 Hex for the final interval. The initial reciprocal values for the intervals also falls, from 0.FC0F Hex×2 for the second interval, to 0.F83E Hex×2 for the third interval, to 0.8208 Hex×2 for the penultimate interval and 0.8102 Hex×2 for the final interval. This occurs because the reciprocal curve flattens out for larger input (x) values.

The initial reciprocal value stored for any entry q is calculated as $2^{16+6}/q$, since section A has 64 ($2^6$) entries from entry 64 to entry 127, and ends at input $1-2^{-16}$. This is the value stored without regard to the decimal point. The slopes are calculated as the difference of the initial reciprocals for adjacent intervals. Thus the slope of the second interval (entry 65) is Y0(65)−Y0(66)=FC0F Hex−F83E Hex=3D1 Hex.

Figure 9:
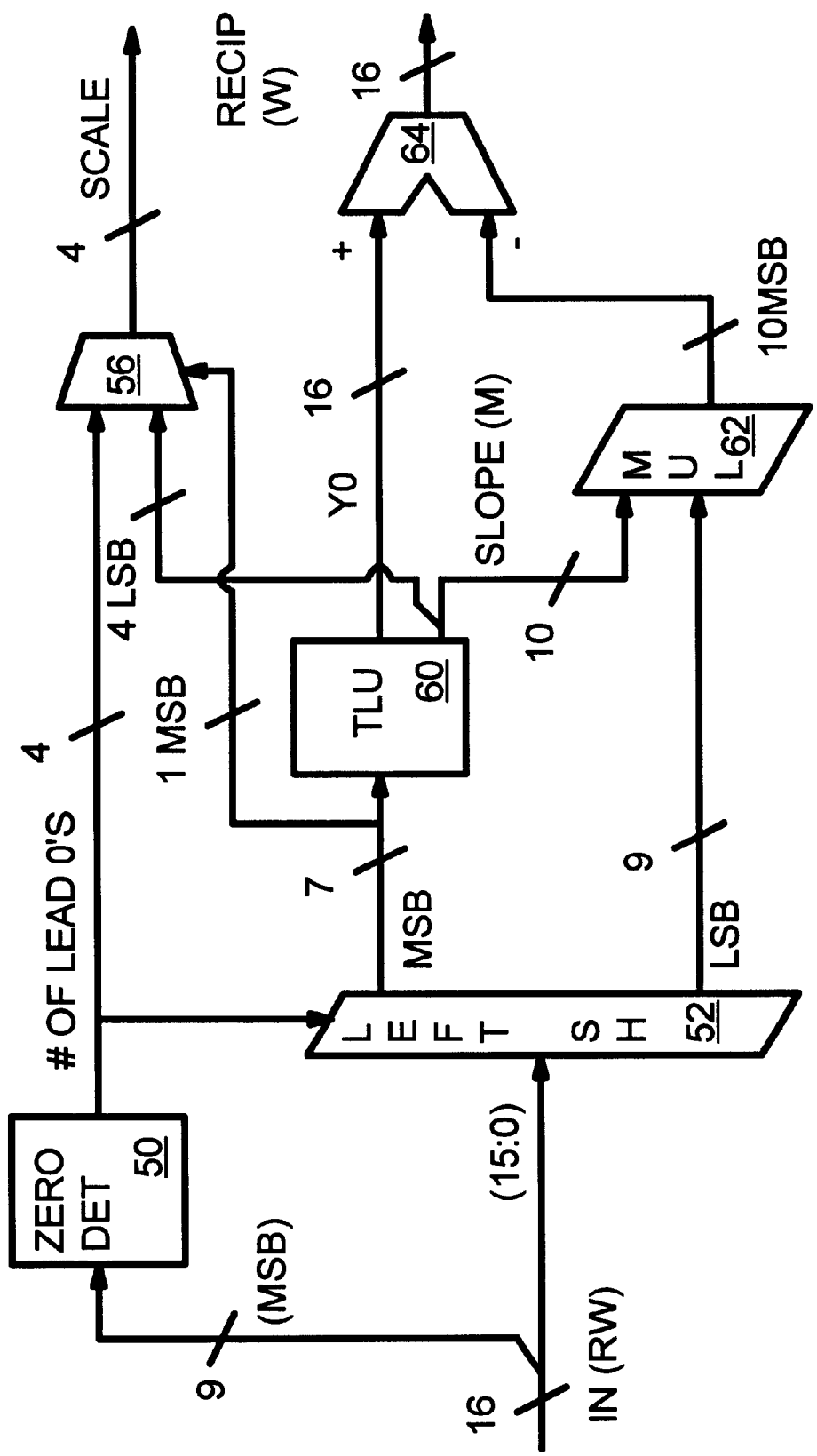
FIG. 9 is a diagram of a reciprocal generator using a lookup table that stores only 2 of 11 sections of the reciprocal curve.

Reciprocal Generator—FIG. 9

FIG. 9 is a diagram of reciprocal generator using a lookup table that stores only 2 of 11 sections of the reciprocal curve. The 16-bit input that represents rw is sent to shifter 52 and leading-zero detector 50. Leading-zero detector 50 counts the number of zero bits from the left until the first one is found, or the number of zero bits reaches 9. This is an indication of the magnitude of the input value, since large inputs such as 2000 Hex ($2^{-3}$) have few leading zeros (2) while smaller inputs such as 0040 ($2^{-10}$) have more leading zeros (9). The number of leading zeros is encoded as a 4-bit number by leading-zero detector 50 and forms the scale factor output by mux 56 for all sections A–J but not for the smallest section K.

Left-shifter 52 shifts the input to the left by the number of zeros detected, so that the first (leading) bit of its output is a one (for sections A–J). Zeros are shifted in from the right (to the LSBs) to fill the vacancies. The 7 MSBs from left-shifter 52 are used as an index (address) into lookup table 60 to select one of the 128 entries.

For sections A–J, left-shifter 52 always shifts the input enough so that the leading bit (MSB of the output of left-shifter 52) is a one. Thus entries 64–127 are selected for sections A–J. However, for section K, the input values are so small with so many leading zeros that left-shifter 52 leaves a zero in the MSB of its output, since the shift size is intentionally limited to 9. Thus section K selects the first 64 entries in lookup table 60.

For sections A–J, the entry selected from lookup table 60 contains an initial reciprocal value Y0 and a slope M. The 10-bit slope M from lookup table 60 is multiplied by the lower 9 bits (LSBs) from left-shifter 52 by multiplier 62. This is the linear adjustment for points that fall between interval endpoints. The 10 MSBs from multiplier 62 are then subtracted as the LSB 10 bits from the Y0 value from lookup table 60 by adder 64 to produce a 16-bit output, the reciprocal base. The 9 LSBs from multiplier 62 are discarded or not even generated.

The actual reciprocal value is the base output by adder 64, multiplied by two raised to the scale from mux 56, or BASE×$2^{SCL}$. The base is assumed to have its decimal point after the left-most bit so that the base has one integer bit and 15 fractional bits.

For smallest section K, leading-zero detector 50 outputs a maximum value of 9, even when very small inputs have more than 9 leading zeros. When there are more than 9 leading zeros, the input value is less than 64 and the input is in the smallest section K. Mux 56 blocks the scale factor from leading-zero detector 50 and instead uses the stored scale factor from lookup table 60. The stored scale factor is the 4 LSBs of the 10-bit M field in lookup table 50, for the first 64 entries, which are for section K, as shown in FIG. 8.

This stored scale factor varies from 10 to 15 decimal (A to F hex), but is not determined by leading-zero detector 50.

Mux 56 is controlled by the MSB output from left-shifter 52. Leading-zero detector 50 outputs a maximum shift of 9. For smallest section K, the leading bit is always zero since the maximum shift of 9 is less than the number of leading zeros (10 or more) of the input.

Mux 56 allows the smallest section K to have its outputs directly controlled by lookup table 60, while other sections A–J have their outputs scaled by the number of leading zeros detected in the input. This allows the other sections A–J to share the same entries in lookup table 60, while the smallest section K is provided with greater precision.

Input-Bits and Scaling Table—FIG. 10

FIG. 10 is a table showing the input bits used for accessing the lookup table and the scaling factors generated for each of the 11 sections. Section A has inputs from $2^{15}$ to $2^{16}-1$, which have a leading bit in bit-position 15, the MSB. Thus no shift is needed, and no leading zeros are detected. The scale factor is 0. The upper 7 bits of the input (15:9) identify one of the 64 intervals in section A, and also the entry in the lookup table. The lower 9 input bits (8:0) are the interpolant, which is the distance from the beginning of the interval to the actual input. The interpolant can be considered an offset into the interval.

Section B has inputs from $2^{14}$ to $2^{15}-1$, which have one leading zero bit in bit-position 15, and a one in bit-position 14. Thus a shift of one is needed, since one leading zero is detected. The scale factor is 1. The upper 7 bits of the shifted input, which are bits 14:8 of the un-shifted input, identify one of the 64 intervals in section B, and thus the entry in the lookup table. The lower 8 input bits (7:0) are the interpolant, the distance from the beginning of the interval to the actual input.

Section C has inputs from $2^{13}$ to $2^{14}-1$, which have two leading zeros bits in bit-positions 15, 14 and a one in bit-position 13. A shift of two is needed, since two leading zeros are detected. The scale factor is 2. The upper 7 bits of the shifted input (bits 13:7 of the un-shifted input) identify one of the 64 intervals in section C, and the lookup table entry. The lower 7 input bits (6:0) are the interpolant.

Section J has inputs from $2^6$ to $2^731$ 1, which have 9 leading zeros bits in bit-positions 15:7 and a one in bit-position 6. A shift of nine is needed, since nine leading zeros are detected. The scale factor is 9. The upper 7 bits of the shifted input (bits 6:0 of the unshifted input) identify one of the 64 intervals in section J, and the lookup table entry. There is no interpolant since the section is so small.

Smallest section K has inputs from 0 to $2^6-1$, which have 10 or more leading zeros bits. A shift of nine is used, since nine is the maximum shift. The scale factor is read from the lookup table, and can be from 10 to 15 (A-F Hex). The upper 7 bits of the shifted input (bits 6:0 of the un-shifted input) identify one of the 64 intervals in section K, and the lookup table entry. There is no interpolant since the section is so small.

Figure 11:
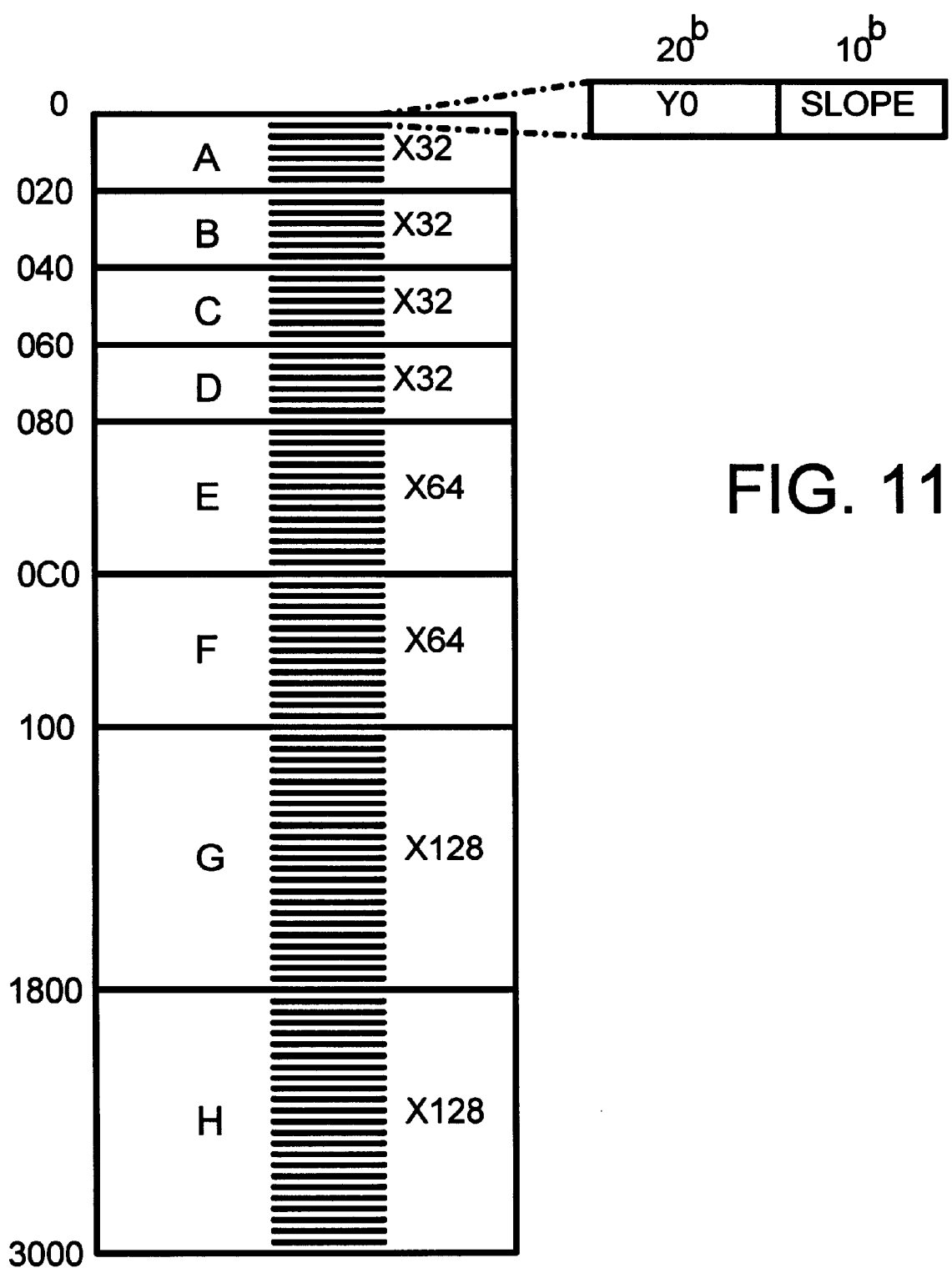
FIG. 11 is a lookup table for an alternate embodiment that has variable numbers of intervals for each section.

Variable Number of Intervals—FIG. 11

FIG. 11 is a lookup table for an alternate embodiment that has variable numbers of intervals for each section. Each of the 8 sections have separate entries in the lookup table rather than share a template section as in the preferred embodiment of FIG. 8. Thus the lookup table is larger and less efficient in this alternate embodiment.

Sections A, B, C, D have only 32 intervals and entries, while sections E, F have 64 entries or intervals. The smallest sections G and H have 128 entries each. A total of 512 entries are used. This is many more entries than the 128 entries in the preferred embodiment. Each entry has a 20-bit initial reciprocal field Y0 and a 10-bit slope.

FIG. 12 is a table for the alternate embodiment with variable numbers of intervals. The number of entries or intervals in each section varies from 32 to 128, while more entries in the smallest sections to provide more precision. Scale factors are generated by a priority encoder or leading zero detector. Bits of the pre-shifted input that identify the entry in the table and the interpolant are shown. The priority-encoder bits are also used to identify the entry's address in the table, since many sections are stored in the table.

ADVANTAGES OF THE INVENTION

A reciprocal generator is ideally suited for perspective correction of texture maps in a 3D graphics system. The size of a lookup table is minimized for a reciprocal function. Only 128 entries rather than 512 entries are required. Entries in the lookup table are efficiently organized to provide sufficient precision over a large dynamic range of inputs and outputs. A better approximation of the reciprocal function results even though a limited-size lookup table is used. A high speed reciprocal generator uses the lookup table and operates over a wide dynamic range.

A piecewise-linear-approximation implementation with sufficient fidelity usually requires a combination of a large table lookup and large arithmetic functions in the form of the multiplier and adder. The present invention reduces the sizes of all of these elements while retaining fidelity. The output range for the smallest section is increased by using the slope fields to store a scaling factor. This allows the other sections A–J to share the same entries in lookup table 60, while the smallest section K is provided with greater precision.

The reciprocal generator is ideally suited for 3D graphics. The reciprocal values near zero are not exact, but rather are the maximum value. This provides for saturated parameter values rather than errors and interrupts that can require special processing than can slow down the graphics processor. More precision is provided for small input values, which produce large output values that the human eye can easily perceive as visible irregularities. Visible distortions are thus minimized.

ALTERNATE EMBODIMENTS

Several other embodiments are contemplated by the inventors. For example other arrangements of the logic blocks are possible. A priority encoder or other arithmetic or compare logic can be used to detect the leading zero. The lookup table can be implemented as a read-only memory (ROM) using various technologies, including erasable or re-programmable flash ROM. This allows for changes in table values to be implemented. The multiplier and adder can be a subset of a full multiplier or adder, or can be implemented in firmware. The inputs and outputs can be normalized in various ways, and the input and output can be multiplied by a fixed factor for normalization. Of course, signals can be inverted so that the leading-zero detector detects high voltages rather than low voltages, or the inputs could be active-low-voltage signals rather than active-high. Other numerical formats such as signed and twos-complement formats may be used with appropriate modification of the logic. Staging or pipeline registers can be inserted. The rw input can be more or less than 16 bits, and the number of intervals can be more or less than 11 for higher or lower precision.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A reciprocal generator comprising:

an input bus;

a leading-zero detector, coupled to the input bus, for generating a scale factor indicating a number of leading zeros of an input value on the input bus;

wherein the leading-zero detector is coupled to only upper bits of the input bus and not connected to lower bits of the input bus;

a shifter, responsive to the leading-zero detector, for shifting the input bus by a number of bit-positions indicated by the leading-zero detector to produce a shifted input;

a lookup table, coupled to the shifter, having a plurality of entries, each entry having an initial reciprocal field and a slope field, the lookup table for outputting an initial reciprocal and a slope for an entry selected by a portion of the shifted input; and an interpolator, coupled to the lookup table, for generating a reciprocal base from the initial reciprocal and the slope output by the lookup table, wherein the reciprocal of the input bus is the reciprocal base from the interpolator scaled by the scale factor from the leading-zero detector, wherein the input bus has an input range, the input range being divided into a plurality of sections;

wherein the lookup table does not have separate entries for each of the plurality of sections, the lookup table having entries for a last section, the last section having largest input values, whereby the reciprocal is generated from the lookup table and the scale factor from the leading-zero detector and entries for the last section but not all sections are stored in the lookup table and the leading-zero detector detects a limited number of leading zeros.

2. The reciprocal generator of claim 1 wherein each successive section has twice an input range of a previous section, whereby successive sections are doubled in input-width.

3. The reciprocal generator of claim 2 wherein each section has a same number of intervals, wherein a number of interval is equal to a number of entries for the last section.

4. The reciprocal generator of claim 3 wherein the interpolator further comprises:

a multiplier, coupled to the lookup table and coupled to the shifter, for forming a product of lower bits of the shifted input and the slope from the lookup table;

an adder, coupled to the multiplier and coupled to the lookup table, for forming a sum of the product from the multiplier and the initial reciprocal from the lookup table, wherein the sum from the adder is output as the reciprocal base.

5. The reciprocal generator of claim 1 wherein the lookup table further stores entries for a first section, the first section having smallest input values, the smallest input values being less than input values from all other sections in the plurality of sections, wherein the lookup table contains entries for only the first section and the last section, but not for intermediate sections, whereby the lookup table has a reduced number of entries than a table having separate entries for all sections.

6. The reciprocal generator of claim 5 further comprising:

a scale mux, coupled to the leading-zero detector, for outputting the scale factor from the leading-zero detector for all sections except the first section, but for outputting a scale factor from the lookup table when the input value on the input bus is in the first section;

wherein the lookup table stores entries for the first section and the last section, wherein entries for the first section contain the initial reciprocal and a stored scale factor, the stored scale factor being output by the scale mux as the scale factor for the initial reciprocal, whereby scale factors for the first section are stored in the lookup table, but scale factors for other sections are generated by the leading-zero detector.

7. The reciprocal generator of claim 6 wherein the initial reciprocal from entries for the first section in the lookup table is output by the interpolator as the reciprocal base, whereby the first section is not interpolated.

8. The reciprocal generator of claim 6 wherein the scale mux is controlled by a most-significant bit of the shifted input form the shifter.

9. The reciprocal generator of claim 8 wherein the shifter shifts zeros into the least-significant bits of the input bus to generate the shifted input.

10. A method for generating a reciprocal from an input, the method comprising:

reading leading bits of the input to detect a bit-position of a leading one;

outputting a scale factor that indicates the bit-position of the leading one;

shifting the input to generate a shifted input that has the leading one in a most-significant-bit position;

addressing a lookup table and selecting a selected entry with an upper group of most-significant bits of the shifted input;

outputting an initial field and a secondary field from the selected entry from the lookup table;

when the shifted input falls within an interval between two adjacent entries in the lookup table:
  sending lower bits of the shifted input to a multiplier, the lower bits not including the upper group that addressed the lookup table;
  sending the secondary field from the selected entry to the multiplier;
  forming a product in the multiplier of the lower bits of the shifted input and secondary field; and
  adding the product from the multiplier to the initial field to generate a reciprocal base;

when the shifted input does not fall within an interval:
  outputting the initial field of the selected entry as the reciprocal base; outputting the reciprocal base and the scale factor as the reciprocal of the input, whereby the scale factor of the reciprocal is generated by detecting the leading one of the input, but the reciprocal base is read from the lookup table and whereby inputs not within the interval are not interpolated by the multiplier.

11. The method of claim 10 further comprising:

limiting the input shift to a maximum shift;

when the bit-position of the leading one exceeds the maximum shift:
  outputting the secondary field of the selected entry from the lookup table as the scale factor;
  outputting the initial field of the selected entry as the reciprocal base, whereby the secondary field supplies the scale factor when the bit-position of the leading one exceeds the maximum shift.

12. The method of claim 11 wherein the selected entry is read from a first section of the lookup table when the bit-position of the leading one exceeds the maximum shift;

wherein the selected entry is read from a second section of the lookup table when the bit-position of the leading one does not exceeds the maximum shift;

wherein one of two sections of the lookup table is selected.

13. The method of claim further comprising:

using a most-significant bit of the shifted input to select either the first section or the second section of the lookup table.

14. A variable-precision reciprocal generator comprising:

an input bus for carrying a binary input value, the binary input value having an input range divided into a plurality of sections, wherein a last section has a leading one in a most-significant bit-position of the input bus, a next-to-last section has the leading one in a second most-significant bit-position of the input bus, a third to-last section has the leading one in a third most-significant bit-position of the input bus, a second section has the leading one in a limit bit-position of the input bus, and a first section has the leading one in one of several bit positions that are less significant than the limit bit-position, wherein each successive section contains double a width of binary input values as a previous section;

priority encode means, coupled to the input bus, for determining a number of leading zeros before the leading one of the binary input value, the priority encode means outputting a scale factor;

shift means, responsive to the priority encode means, for shifting the input bus to generate a shifted input;

table means, coupled to the shift means, for outputting a selected entry, the selected entry located by upper bits of the shifted input, the table means having last section entries selected when a most-significant bit of the upper bits from the shifted input is high, but first-section entries selected when the most-significant bit of the upper bits from the shifted input is low, the table means outputting an initial field and a secondary field for the selected entry;

adjust means, coupled to the table means, for generating a reciprocal base by adjusting the initial field by an adjust amount, the adjust amount being generated from lower bits of the shifted input and from the secondary field of the selected entry;

wherein a reciprocal of the binary input value is output as the reciprocal base from the adjust means scaled by the scale factor from the priority encode means when a last-section entry in the table means is selected.

15. The variable-precision reciprocal generator of claim 14 wherein the priority encode means includes limiting means that limits the shift means to shift by a limited shift, the limited shift being a shift amount sufficient to shift the leading one in the limit bit-position to the most-significant bit-position;

wherein when the binary input value is in the first section, the limiting means limits the shift means so that the shift means shifts one of the leading zeros into the most-significant bit-position of the shifted input;

wherein the most-significant bit of the upper bits from the shifted input is a zero when the binary input value is in the first section.

16. The variable-precision reciprocal generator of claim 15 further comprising:

mux means, coupled to receive the scale factor from the priority encode means, for outputting the scale factor from the priority encode means when the binary input value is not in the first section, but for outputting the secondary field of the selected entry from the table means when the binary input value is in the first section, whereby the scale factor is output by the table means for the first section, but generated by the priority encode means for other sections.

17. The variable-precision reciprocal generator of claim 16 wherein the table means contains 64 first-section entries and 64 last-section entries, but no entries for the next-to-last section, the third-to-last section, or the second section, whereby a size of the table means is reduced.

* * * * *